June 30, 1970 R. A. SWANSON 3,518,618

TELEPHONE TYPE CONNECTOR BLOCK AND MOUNTING BRACKET

Filed March 21, 1968 2 Sheets-Sheet 1

INVENTOR
R. A. SWANSON
BY E. J. Snider
ATTORNEY

June 30, 1970 R. A. SWANSON 3,518,618

TELEPHONE TYPE CONNECTOR BLOCK AND MOUNTING BRACKET

Filed March 21, 1968 2 Sheets-Sheet 2

United States Patent Office 3,518,618

Patented June 30, 1970

3,518,618

TELEPHONE TYPE CONNECTOR BLOCK AND MOUNTING BRACKET

Robert A. Swanson, Towson, Md., assignor to Bell Telephone Laboratories, Incorporated, Murray Hill and Berkeley Heights, N.J., a corporation of New York

Filed Mar. 21, 1968, Ser. No. 714,995

Int. Cl. H02b *1/04*

U.S. Cl. 339—125 6 Claims

ABSTRACT OF THE DISCLOSURE

A telephone type connector block and mounting bracket combination is shown in which the bracket receives the block with snap-on arms. The bracket legs constitute a cable run so that the space adjacent bracket and block is free for jumper wires. The connector block retaining plate is slide-mounted onto the block. The brackets are fastened in vertical rows at termination points, such as key telephone closets, and the blocks readily snap mount into or unsnap from the brackets.

This invention relates to electrical terminal apparatus and more particularly to telephone type connector blocks and means for mounting them.

BACKGROUND OF THE INVENTION

At various locations in the telephone plant, it is necessary to provide for multiple appearances of conductors and to crossconnect large numbers of these. Examples of such points are central offices, cable vaults in apartment buildings and the like, and key telephone station closets in office buildings and elsewhere. Typically, the connector blocks are fastened in vertical columns to a wall or backboard, with spaces between columns to allow for runs of jumper wire between and among the blocks. Usually the blocks are affixed to the wall or backboard with metallic fasteners such as bolts or wood screws. Consequently, in constructing the original installation as well as in the frequent rearrangement work, an installer spends substantial time in carpentry work.

An added problem of connector block mounting schemes of the present art is that the cables whose pairs are connected to the block run in the space between blocks. The cables thus diminish the interblock space needed for jumper wires and in so doing add to the confusion of wires at the interconnection facility.

In substantially reducing the above-noted problems, the present invention establishes the concept of a bracket for snap mounting of connector blocks; and, further, whose interior serves as a cable run.

One object of the invention, accordingly, is to simplify the installation and maintenance of telephone interconnection facilities.

A specific object of the invention is to reduce the time and cost of setting up and maintaining a key telephone station closet.

A further object of the invention is to conceal connector block feeder cable in an out-of-the-way plate at interconnection points.

SUMMARY OF THE INVENTION

These and other objects are achieved in accordance with the invention by a connector block and bracket combination in which the block snap mounts onto the bracket, and the bracket houses connector cable between its two longitudinal legs. The brackets may be pre-positioned in vertical columns in an original installation, with the blocks being added when the need arises. Alternatively, the brackets may be pre-positioned on backboard modules as described in the copending application of F. J. Mullin, R. B. Ramsey, C. Scholly, Ser. No. 714,994 filed concurrently with the instant application and assigned to applicant's assignee.

A feature of the bracket is that it can be molded as a unitary piece and hence be produced quite inexpensively.

Another feature of the bracket is that several central openings are afforded at different levels in the through passage between its legs to allow for a fanning out of the cable conductors for connection to the associated block.

The invention, its further objects, features, and advantages will be readily apprehended from a reading of the description to follow of an illustrative embodiment thereof.

DETAILED DESCRIPTION OF AN ILLUSTRATIVE EMBODIMENT

Figure 1:
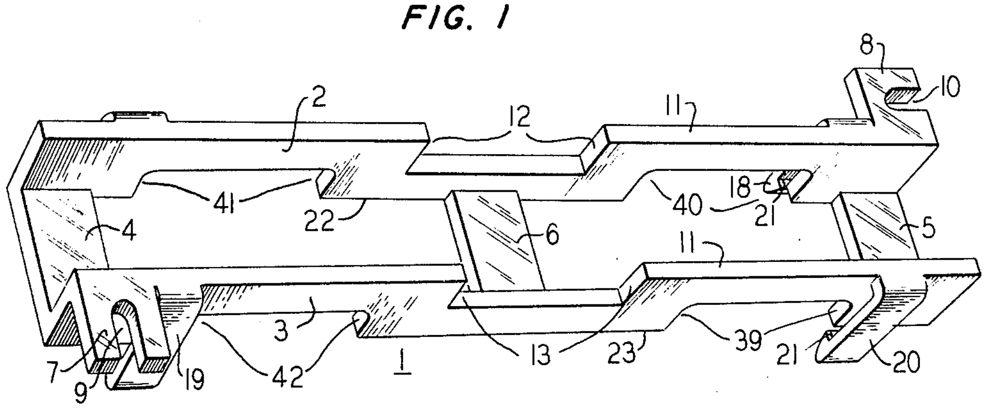
FIG. 1 is a rear perspective view of one embodiment of the bracket.

As seen in FIG. 1, the bracket designated 1, consists of two parallel elongated legs 2, 3 joined by beams 4 and 5 at the end portions and by a beam 6 at the midportion. One manner of fastening bracket 1 to a vertical wall or backboard is with end tabs 7 and 8. Slots such as 9 and 10 may be provided in end tabs 7, 8 to receive a suitable fastener.

Figure 2:
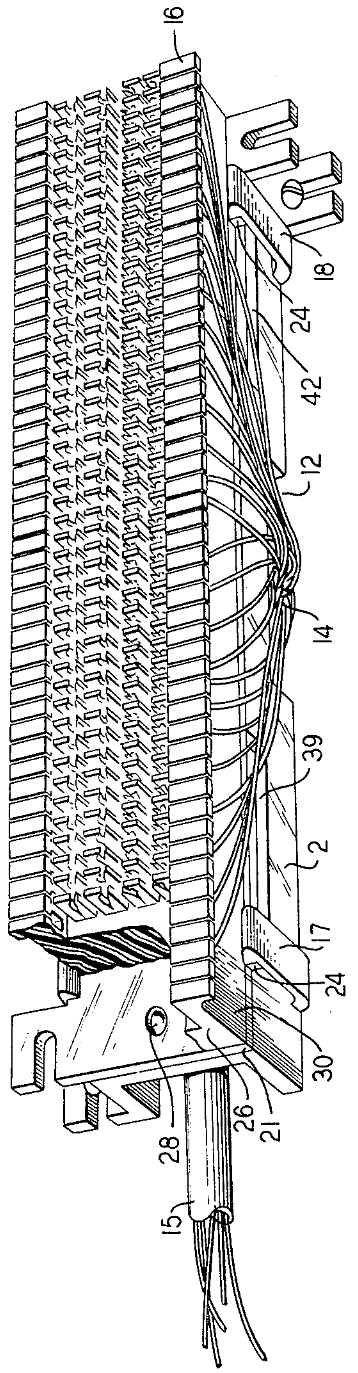
FIG. 2 is a frontal perspective view of the bracket with a connector block snap mounted thereto.

When bracket 1 is appropriately fastened to a surface, a longitudinal run or passage is defined by the parallel legs 2, 3 and the beams 4, 5, 6 which join the legs. The surface designated 11 at the leg bottoms is essentially planar to lie flat against the mounting board. A pair of elongated slots 12, 13 struck inwardly of surface 11 in the respective legs 2, 3 serve as a central exit from the cable passage to either side of the bracket 1. As seen in FIG. 2, a group of conductors 14 are fanned out from a cable such as 15 running in the aforementioned passage. Conductors 14 are led through the slot 12 and are fanned out to the fanning strip 16 which is of the conventional variety used on connector blocks. Conductors 14 can also be led through slots 39, 40, 41, 42. Slots provided on two different levels allow for a looser cable packing within the bracket and thus avoid crushing of the cables.

Bracket 1 includes resilient arms 17, 18 which fasten to respective ends of side 2, at a point near surface 11, and which extend upwardly as seen in FIG. 2. Similarly, arms 19 and 20 are disposed with respect to side 3 in a manner identical to the disposition of arms 17, and 18 on side 2. Each of the arms 17, 18, 19, and 20 includes an inwardly extending hook portion 21. These arms with their hooks 21 cooperate with the upper surface of bracket 1 to snap mount and retain a connector block in a manner now to be described.

Figure 3:
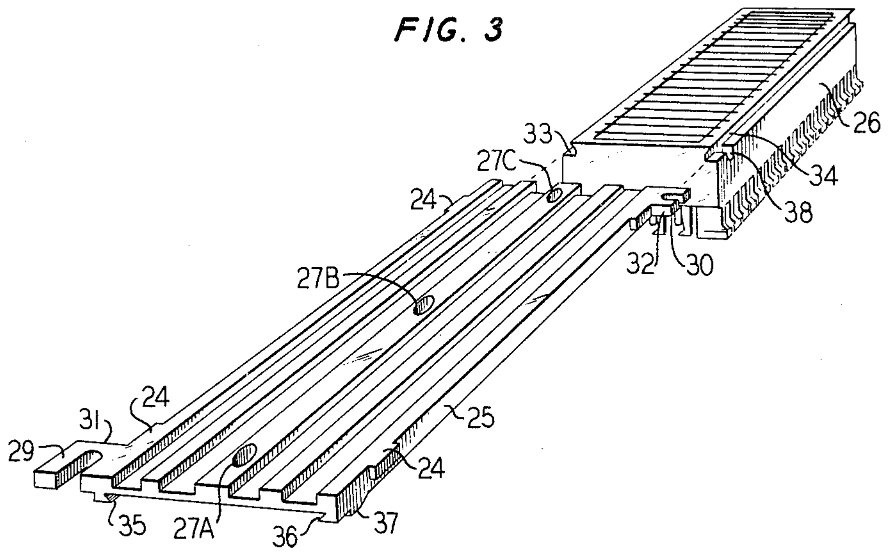
FIG. 3 is a side perspective view of the connector block.

The outer side of the bracket 21 is formed by a series of surfaces which by design all fall in the same plane. These surfaces include the outer sides of beams 4, 5, and 6 as well as the raised midportions 22, 23 of sides 2, 3 respectively. The horizontal part of each hook 21 lies a predetermined distance above this planar surface. That distance is substantially equal to the thickness of gripping tabs 24 extending from the bottom retaining plate 25 of connector block 26. As seen in FIG. 3, four such tabs 24 are incorporated into plate 25, their spacing conforming to the spacing of arms 17, 18, 19, 20. It is important that bracket 25 support the block 26 not merely at the ends, but throughout the length thereof. The forces which block 26 experiences during wire termination thus are adequately countered.

Pursuant to one facet of the invention, when bracket 1 is free of connector block 26, resilient arms 17 and 19 are spaced apart such that the distance between their opposed interior surfaces is less than the width of retaining plate 25 taken between the tab extremities. From the foregoing it is seen that when block 26 is sought to be engaged on bracket 1, it is only necessary to lightly force the tabs 24 down onto hooks 21 to first spread the arms apart. Then, when the tabs 24 clear the hooks, all four arms snap over the tabs 24 and grip the retaining plate 25 firmly.

On method of assuring longitudinal positioning is to incorporate a number of alignment holes such as 27*a*, 27*b*, 27*c* through the underside of plate 25. These holes are engaged by hemispheric nubs such as 28 extending from the outer surface of beam 4, as shown in FIG. 2. Other nubs (not shown) in beams 5 and 6 engage the remaining alignment holes 27 of plate 25 when the latter is properly aligned with respect to the bracket arms. In one embodiment (not shown) hole 27*b* is round and mates tightly with its nub 28. Holes 27*a* and 27*c* (FIG. 3) are elongated. The longitudinal spacing of the holes in plate 25 thus can vary slightly from the spacing of the nubs in the bracket. When the bracket and block are mounted on a vertical wall, the center nub in beam 6 supports the block in the vertical direction, while all three nubs 28 restrict horizontal movement and restrict rotation in the mounting plane.

An alternative to tabs 24 of connector block retaining plate 25 would be to design the width of plate 25 to a uniform dimension equal to the distance between the tabs 24 ends.

Plate 25 includes end shelves 29, 30 at diagonally opposite corners thereof as shown in FIG. 3. End shelves 29, 30 are slotted to receive a conventional fastener when block 26 is to be mounted directly to a wall or the like. However, when used with bracket 1, the shelves 29, 30 of plate 25 serve the added function of helping to maintain the longitudinal alignment of block 26 with respect to its mounting bracket 1.

Once the connecting block has been attached to the mounting bracket, arms 17, 18, 19, and 20 are usually in a stress-free state. The arms' primary function is to restrict motion normal to the mounting plane in a direction away from the plane. Under such conditions, the arms are loaded only in tension. However, in actual use, most of the forces on the connecting lock normal to the mounting plane will be compressive forces due to wire termination. These forces will be transmitted from the block through the parallel elongated legs 2, 3 of the bracket. Accidental disturbance of the connecting block will cause only tensile stress in the arms 17, 18, 19, 20. Bending deflections which could cause the arms 17–20 to break off are not permitted since nubs 28 restricted horizontal displacement of the block.

A further aspect of plate 25 involves the manner in which it is mounted on the underside of block 26. Specifically, a track on the underside of block 26 and consisting of grooves 33, 34 is engaged by two extending tongues 35, 36 on the interior side of plate 25. This expedient is shown in FIG. 3. Plate 25 is slidably mounted onto the grooves 33, 34, until a raised portion 37 of the tongue 36 abuts the end of block 26. A sufficient clearance between tongue 36 and groove 34, as well as the plasticity of plate 25 makes possible thereafter the forcing of extension 37 arm to the block and finally into the retaining hole 38.

It is to be understood that the embodiments described herein are merely illustrative of the principles of the invention. Various modifications may be made thereto by persons skilled in the art without departing from the spirit and scope of the invention.

What is claimed is:

1. In combination:
a bracket comprising:
a pair of elongated sides and a mounting surface with a planar exterior;
one or more compliant gripping arms extending from each said side to points above the plane of said mounting surface; and
an interior passage defined by said mounting surface and said sides for housing lengths of conductor cable; and
a connector comprising:
a block, and
a base plate secured to said block and including surfaces for engaging said gripping arms when said plate is placed upon said bracket mounting surface.

2. The combination of claim 1, wherein each said side further comprises a central aperture for guiding conductors from said passage to said block for connection thereto.

3. In combination:
a bracket comprising:
a pair of elongated sides and a mounting surface with a planar exterior, said surface comprising one or more upwardly extending nubs, and
first and second pairs of compliant juxtaposed gripping arms, each said arm comprising an inwardly-directed end hook whose distance above said bracket mounting surface substantially equals the thickness of said base plate engaging surfaces, said pairs being resiliently mounted adjacent the respective ends of said bracket sides, each said arm extending outwardly from its side to a point above said mounting surface;
and a connector comprising:
a block, and
a base plate secured to said block and comprising surfaces for engaging said gripping arms when said plate is placed upon said bracket mounting surface, and
a corresponding number of alignment apertures spaced for engagement with said nubs, thereby to maintain position of said block with respect to said bracket.

4. The combination of claim 3, wherein said base plate further comprises at least one tab extending laterally outwardly at each end of the plate, each such tab being spaced for abutting relation with an exterior side of the adjacent gripping arm, thereby to restrict longitudinal movement of said block with respect to said bracket.

5. The combination of claim 4, wherein the bracket further comprises an interior passage defined by said mounting surface and said sides for housing lengths of conductor cable.

6. The combination of claim 5, wherein each said side further comprises one or more central apertures for guiding conductors from said passage to said block for connection thereto.

References Cited

UNITED STATES PATENTS

| | | | |
|---|---|---|---|
| 1,639,310 | 8/1927 | Richardson | 174—60 |
| 3,091,679 | 5/1963 | Norden | 339—128 X |
| 3,112,147 | 11/1963 | Pferd et al. | 339—97 |
| 3,417,368 | 12/1968 | Norden | 339—198 X |

RICHARD E. MOORE, Primary Examiner